US007200611B2

(12) United States Patent
Potrebic et al.

(10) Patent No.: US 7,200,611 B2
(45) Date of Patent: Apr. 3, 2007

(54) TV PROGRAM DATABASE

(75) Inventors: Peter J. Potrebic, Calistoga, CA (US);
Thomas H. Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 10/145,461

(22) Filed: May 13, 2002

(65) Prior Publication Data

US 2003/0212708 A1 Nov. 13, 2003

(51) Int. Cl.
G06F 17/30 (2006.01)

(52) U.S. Cl. ............ 707/104.1; 707/10; 707/101; 707/102; 707/103 X; 707/202; 707/203; 707/204

(58) Field of Classification Search .......... 707/2, 707/3, 9, 10, 102, 104, 201, 203, 6, 101, 707/104.1, 103 X, 202, 204; 725/24, 109; 348/473, 27, 461; 386/83, 46; 709/203; 715/789
See application file for complete search history.

(56) References Cited

U.S. PATENT DOCUMENTS

| 4,706,121 A | * | 11/1987 | Young ............... 348/27 |
| 5,880,720 A | * | 3/1999 | Iwafune et al. ........ 725/24 |
| 5,949,492 A | * | 9/1999 | Mankovitz ........... 348/473 |
| 6,233,734 B1 | | 5/2001 | Macrae et al. |
| 6,289,169 B1 | * | 9/2001 | Okuyama ............. 386/83 |
| 2001/0014976 A1 | | 8/2001 | Roop et al. |
| 2001/0024584 A1 | | 9/2001 | Young et al. |
| 2002/0150387 A1 | * | 10/2002 | Kunii et al. ......... 386/83 |
| 2003/0051252 A1 | * | 3/2003 | Miyaoku et al. ...... 725/109 |
| 2003/0067554 A1 | * | 4/2003 | Klarfeld et al. ...... 348/461 |
| 2003/0105809 A1 | * | 6/2003 | Yoshii et al. ........ 709/203 |
| 2003/0206710 A1 | * | 11/2003 | Ferman et al. ........ 386/46 |
| 2005/0188328 A1 | * | 8/2005 | Sezan et al. ......... 715/789 |

FOREIGN PATENT DOCUMENTS

| WO | WO 00/27122 | 5/2000 |
| WO | WO 02/08948 | 1/2002 |

* cited by examiner

*Primary Examiner*—Thuy N. Pardo
(74) *Attorney, Agent, or Firm*—Lee & Hayes, PLLC

(57) ABSTRACT

Before a programming guide is created, a unique code is assigned to each TV program that can be identified in the programming guide. Prior to the creation of the programming guide, a viewer selects the unique code corresponding to the TV show that the viewer would like to record whenever that TV show is broadcast. When the programming guide is created, the corresponding unique codes are associated with each TV program in the programming guide. The TV program corresponding to the viewer-selected unique code is then scheduled to be recorded in accordance with the announced broadcast schedule in the programming guide. A recording is made of the TV program corresponding to the viewer-selected unique code as the TV program is broadcast in accordance with the announced broadcast schedule in the programming guide.

60 Claims, 7 Drawing Sheets

TV PROGRAM DATABASE

TECHNICAL FIELD

The present invention relates to recording a television (TV) program broadcast on a channel. More particularly, the present invention relates to a database to keep track of TV programs that have been, or are desired to be, watched or recorded and from which there are selected TV programs for recording prior to their announced broadcast in a program guide.

BACKGROUND

Client devices in a television-based entertainment system include set top boxes such as cable boxes, satellite receivers, digital video recorders, and video cassette recorders (VCRs). Some client devices have recording capabilities and can be set-up by a viewer to record a television (TV) program that will be broadcast sometime in the future. Typically, the viewer will set-up a client device ahead of time so that it will record a TV program on a particular date at a certain starting time, on a particular broadcast channel, and for a particular duration. After the set-up, on the particular date, the client device will automatically tune a tuner to the particular channel at the particular starting time and record the TV program being broadcast for the particular duration. After the recording of the TV program has been made, the recording can be played back for the enjoyment of the viewer.

The viewer can generally find programs to record by looking at a line-up of programs for various broadcast channels that is published in newspapers, magazines, and at Web sites on the Internet. Some client devices can receive a transmission of data from which there can be assembled an Electronic Programming Guide (EPG). Similar to the published line-up of programs, the EPG informs the viewer of future programming for which the viewer may wish to set up the client device to record.

While the published line-up of programs and the EPG are useful in finding television programs or shows to record, the selection from these are generally limited to a future time period not more than one to two weeks. This limitation is quite severe as compared to the universe of all television programming that is available for broadcasting. A viewer may wish to view a television program because a favorite actress is featured, or because the particular plot is of interest. The viewer, however, will not be able to find out when the television program will air if information regarding same appears neither in the published line-up of programs or the EPG. Since the viewer is not so informed as to a future date at which a desired television program will air, the viewer will not be able to set up the client device to record the television program. It would be an advantage in the art to provide a viewer with the ability to specify a television program to record even if it does not appear in a published line-up of programs or an EPG. Consequently, there is a need for improved databases, methods, apparatus, client devices, systems, and computer programs that can provide such a capability.

SUMMARY

In an implementation, databases, methods, apparatus, client devices, systems, and computer programs are used to assign a unique code to each TV program that can be identified in a programming guide before the programming guide is created. Prior to the creation of the programming guide, a viewer selects the unique code corresponding to the TV show that the viewer would like to record when that TV show is broadcast. When the programming guide is created, the corresponding unique codes are associated with each TV program in the programming guide. The TV program corresponding to the viewer-selected unique code is then scheduled to be recorded in accordance with the announced broadcast schedule in the programming guide. A recording is made of the TV program corresponding to the viewer-selected unique code as the TV program is broadcast in accordance with the announced broadcast schedule in the programming guide.

DETAILED DESCRIPTION

Figure 1:
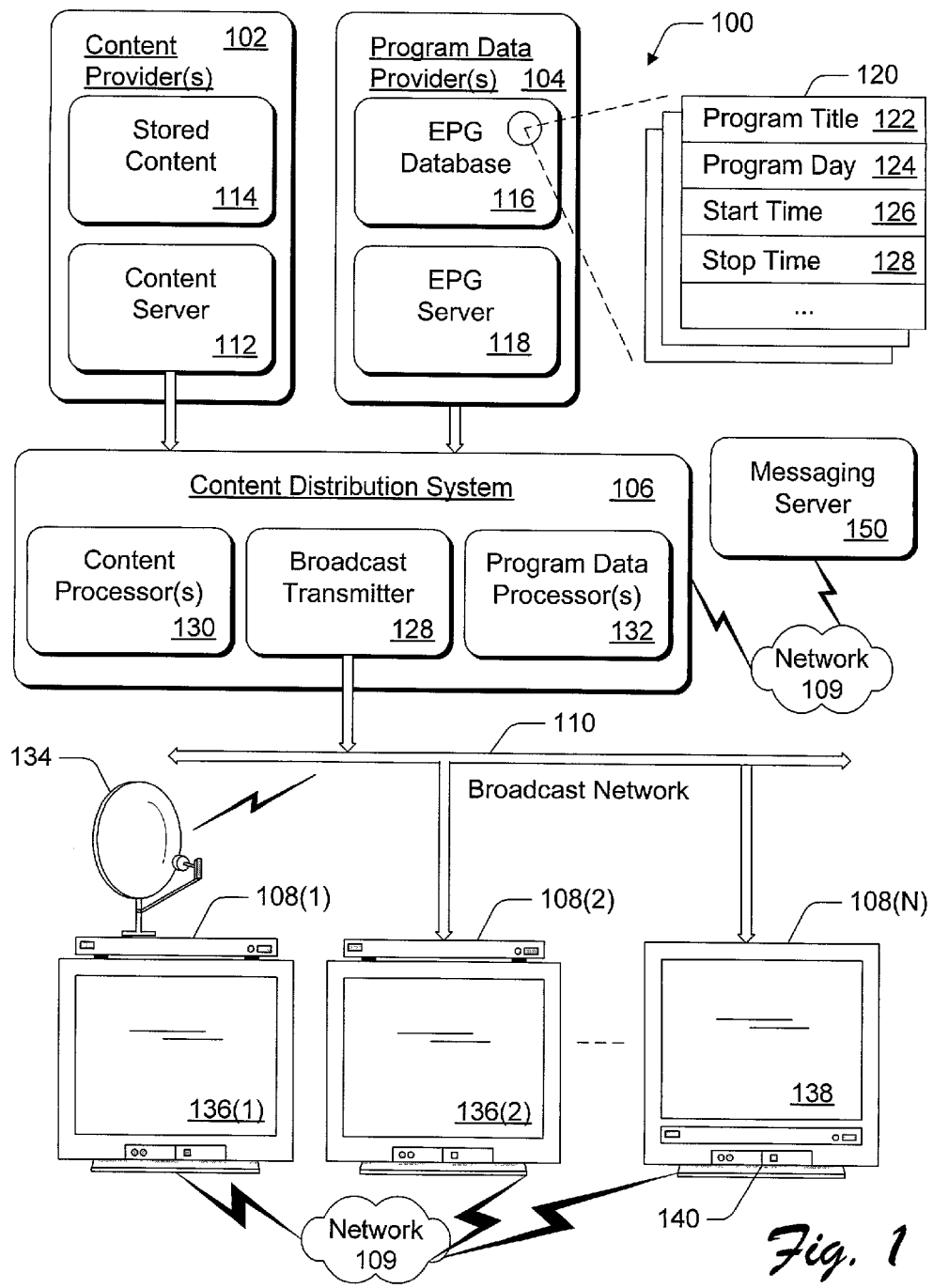
FIG. 1 illustrates an exemplary environment in which the databases, methods, apparatus, client devices, systems, and computer programs described herein may be implemented, and more particularly showing a content distribution system broadcasting to a plurality of client devices, where both the content distribution system and each client device is in communication with a two-way network.

A vast collection of audio-video (AV) content is available to be broadcast on a television broadcasting system, including previously broadcast (TV) shows, movies that had a run at 'the box office', past sporting events, etc. Additionally, new audio-video (AV) content is constantly being produced by motion picture studios (e.g. 'Hollywood'), documentary producers, sporting associations (e.g. NFL, NBA, NHL, PGA, etc.), and so on. The more recently produced AV content, such as first run movies, are generally not released to broadcast television until they have had a run at 'the box office'. Also, certain sporting events are broadcast annually or periodically, such as the World Series of Baseball in the USA, the Super Bowl of the NFL, and the various summer and winter Olympics sporting events. After the passage of time, and generally after a decline in interest of the public, each AV content is released to broadcast television. The exact date, time, and channel that each AV content will be broadcast are not known until this information appears in the publication a program guide. A viewer can review the contents of the program guide to locate a desired TV show and then set up a video recording device, such as a digital video recorder, to record the desired TV show at the date and time announced in the program guide.

In one implementation, each TV show that can be announced in a programming guide is assigned a unique code, called a show identifier (ID), before the programming guide is created. This show ID, which is unique to its respective assigned TV show, can be created by an entertainment industry service provider, or other entity. The show IDs can then be made available on the Internet, such as via a Web hosting service. A client device, such as a set top box or digital video recorder, can communicate with the Web hosting service to obtain the show IDs. A viewer can then select one or more show IDs, either using the client device or other network resource, in order to designate corresponding TV shows that the viewer would like to record, whenever the respective TV shows are broadcast. Each such designation creates a request ID to indicate, for a corresponding show ID, that the viewer would like to make a recording of the corresponding TV show when it is broadcast.

When a programming guide is created, an event schedule for each TV show is given. Each TV show that appears in the programming guide is also associated with its respective show ID. The association of TV shows with respective show IDs can be performed by the publisher of the programming guide, one or more program data providers, and/or by an entertainment industry service provider or other entity such as a Web hosting service. The show IDs associated with the TV shows in the programming guide are then compared to those request IDs that were created based upon the viewer's previous selections. When a match is found, the TV show corresponding to the match is scheduled to be recorded according to its broadcast schedule in the programming guide. This scheduling is performed by the creation of a program event. The program event coordinates the recording of each TV program that the viewer previously selected when it is broadcast at the date and time announced in the programming guide. Either the scheduling of the recording and/or the actual recording of TV shows can be performed at a client device or other network resource.

A viewer can use a database to select for recording first run movies that are currently at 'the box office' when each is eventually broadcast. Moreover, TV shows that were previously broadcast can also be scheduled to be recorded even before a re-run of the same is announced in a programming guide. As such, a viewer can use the database of show IDs to schedule for recording both old and new TV shows even though the viewer has no way of knowing when they will be broadcast. Thus, the viewer can optionally avoid reviewing each published programming guide as it issues to find and set up to record those TV shows that the viewer knows in advance that the viewer would like to record. The viewer's experience with the client device is thereby enhanced.

Each programming guide contains event schedules. The programming guide can be received in the memory of the client device through a variety of techniques, and is generally within a guide database which can be an electronic program guide (EPG). The EPG can be received into the memory of the client device through a variety of techniques, including but not limited to trickle streaming the same from a satellite signal or from another program guide data provider. The EPG is typically continually supplied to the client device and includes information that relates to the programming content that will be broadcast in the future. More specifically, the guide data contains information that indicates, in advance, the starting time and ending time of the programs that are described by the guide data. The EPG also includes the channel, and the program title. Thus, when a request ID in the database of the client device has a corresponding Show ID that can be matched to a TV program listed in the EPG, the client device is directed to create a program event that coordinates the client device to record the program that is listed in the EPG at its corresponding broadcast time.

The discussion herein is directed to television-based entertainment systems, such as interactive TV networks, cable networks that utilize electronic program guides, and Web-enabled TV networks. Client devices in such systems range from full-resource clients with substantial memory and processing resources, such as TV-enabled personal computers, digital video recorders, and TV recorders equipped with hard-disks, to low-resource clients with limited memory and/or processing resources such as traditional set-top boxes and client devices that can record on to video tape such as video cassette recorders. While aspects of the described methods and computer programs can be used in any of these systems and for any types of client devices, they are described in the context of the following exemplary environment.

Exemplary Environment

FIG. 1 illustrates an exemplary environment 100 in which the methods, apparatus, client devices, computer programs, and systems described herein may be implemented. Exemplary environment 100 is a television entertainment system that facilitates distribution of content and program data to multiple viewers. The environment 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data 120 which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 120 that may include a program title 122, a program day or days 124 to identify which days of the week the program will be shown, and a start time or times 126 to identify the time that the program will be shown on the particular day or days of the week.

The EPG server 118 processes the EPG data prior to distribution to generate a published version of the program data, which contains programming information for all channels for one or more days. The processing may involve any number of techniques to reduce, modify, or enhance the EPG data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 102 via a satellite 134 directly to a client device 108 by use of a satellite dish 134. The EPG data need not be received via a video signal. Rather, the EPG data can be received by the client device by tuning to a low bandwidth carrier signal that piggybacks with other signals and is generally transmitted at a lower data rate than video signals that are transmitted by satellite.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 108. Similarly, program data processor 132 processes the program data received from program data provider 104 prior to transmitting the program data across broadcast network 110. A particular content processor 130 may encode, or otherwise process, the received content into a format that is understood by the multiple client devices 108(1), 108(2), ..., 108(N) coupled to broadcast network 110. Although FIG. 1 shows a single content provider 102, a single program data provider 104, and a single content distribution system 106, exemplary environment 100 can include any number of content providers and/or program data providers coupled to any number of content distribution systems.

Content distribution system 106 is representative of a headend service that provides EPG data, as well as content, to multiple subscribers. Each content distribution system 104 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), ..., 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are incorporated into the television, rather than using two separate devices. The set-top box incorporated into the television may receive broadcast signals via a satellite dish (similar to satellite dish 134) and/or via broadcast network 110. In alternate implementations, client devices 108 may receive broadcast signals via a two-way network 109, such as the Internet, or any other broadcast medium.

Each client device 108 runs a universal TV program listing and selection application that utilizes the TV program data that can be preloaded into the client device, received by broadcast via broadcast network 110 such as from content distribution system 106, or received from two-way network 109. When client device 108 performs the execution of the universal TV program listing and selection application, a television viewer is enabled to navigate through an onscreen guide to locate one or more television shows in a universe of all television shows that can be broadcast. Thus, the television viewer can select those TV programs that the viewer is interested in recording when ever they are broadcast on broadcast network 110. When each such designed TV program does air as identified in the program data of an EPG, client device 108, in turn, creates one or more corresponding program events to make the recordings.

Each client device 108 also runs an EPG application that utilizes the program data. The EPG application enables a television viewer to navigate through an onscreen program guide and locate television shows of interest to the viewer. With the EPG application, the television viewer can look at schedules of current and future programming, set reminders for upcoming programs, and/or enter instructions to record one or more television shows. The client device 108, in turn, creates one or more corresponding program events for the recordings.

Also included in environment 100 are one or more network devices, such as a messaging server 150, that communicate with content distribution system 106 and with client devices 108 (1-N) through interconnected network 109, such as the Internet. Interconnected network 109 allows two-way communication between client devices 108 (1-N) to messaging server 150. This communication allows client devices 108 (1-N) and/or messaging server 150 to transmit addressed messages over interconnected network 109. Each message can contain a message that is addressed to a network resource, such as to an email address at an email server, to a Web site address of a web site on the Internet, to a facsimile telephone number of a facsimile machine on a telephone network, or as is conventional with other message delivery modalities. Each addressed message can contain information of, or relating to, client devices 108 (1-N) in the recording of TV programs that are requested by a viewer. By way of example, and not by way of limitation, a viewer can use the client device 108, or a personal computer or other network device to log on to network 109, such as the Internet, and to communicate with messaging server 150 or other network resource so as to locate any message that has been sent.

The messaging server 150 can be a network service, such as a Web hosting service, that stores data about any client device 108 or its respective viewer. The viewer can keep data at messaging server 150 that can in turn be accessed by other Web hosting services on the Internet where the viewer has permitted such access, which may be of a limited nature. An example of such a data provider is the Microsoft Network (MSN) of the Microsoft Corporation of Redmond, Wash. MSN provides a .NET™ PASSPORT® service that, among other services, stores data that can be retrieved by other Web services on the Internet that are compatible with the .NET™ PASSPORT® service. In this example, the viewer can submit various contact information to messaging server 150. These contact information can be one or more addresses to which messages are to be sent that contain information of, or relating to, the recording of viewer-designed TV programs with respect to a particular client device 108. When a TV program is first scheduled to air according to EPG data, and a viewer has previously indicated a desire to record the TV program with a particular client device 108, client device 108 can send a message to messaging server 150 over network 109. Messaging server 150 can identify the particular client device by the content of the message, and then transmit the message to the one or more addresses that the viewer has stored at messaging server 150.

The process and circumstances under which messaging server 150 transmits messages to the one or more addresses can be variously configured. For instance, messaging server 150 can be configured to transmit textual messages during daylight hours to a cellular telephone number and to transmit the same to a facsimile machine during evening hours. The configuration of a Web hosting service, such as messaging server 150, can be operated by the viewer from a two-way network resource having access to interconnected network 109, such as a personal computer or a local set top box client device. Of course, alternative configurations are contemplated as are conventional with message delivery modalities.

Optionally, one or more of the program data providers 104 can include stored on-demand content, such as Video On-Demand (VOD) movie content. The stored on-demand content can be viewed with a client device 108 through an onscreen movie guide, for example, and a viewer can enter instructions to stream a particular movie, or other stored content, down to a corresponding client device 108.

Exemplary Client Device

Figure 2:
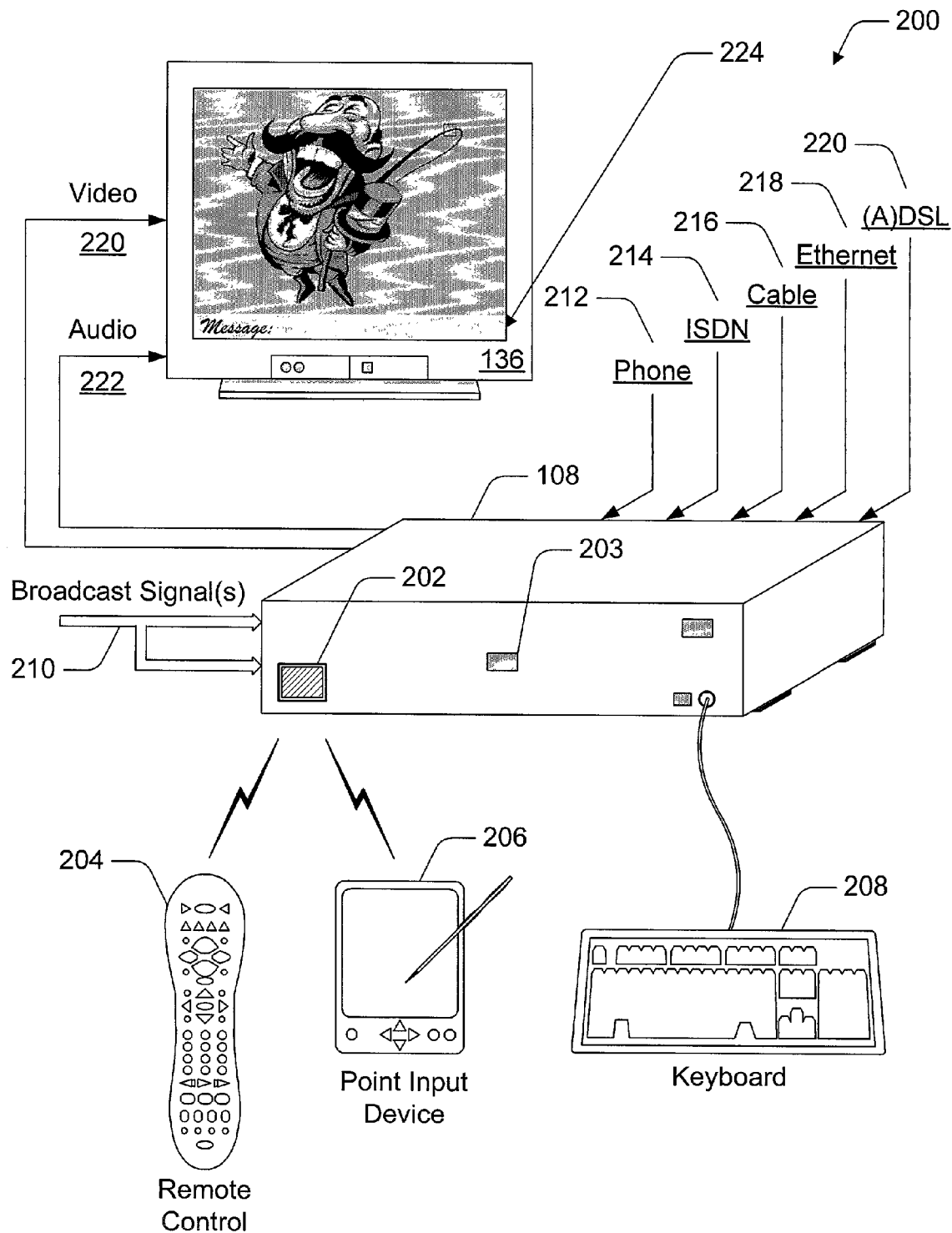
FIG. 2 illustrates an example client device, a television, and various input devices that interact with the client device.

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, a game console, an information appliance, and so forth. Client device 108 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network. Client device 108 includes hardware and/or software for receiving and decoding broadcast signal 210, such as an NTSC, PAL, SECAM or other TV system video signal. Client device 108 also includes hardware and/or software for providing the viewer with a graphical user interface by which the viewer can, for example, access various network services, configure the client device 108, and perform other functions.

Client device 108 is capable of communicating through interconnected network 109 seen in FIG. 1 with other devices via one or more connections including a conventional telephone link 212, an ISDN link 214, a cable link 216, an Ethernet link 218, an ADSL and/or DSL link 220, and the like. Client device 108 may use any one or more of the various communication links 212–220 at a particular instant to communicate with any number of other devices and/or to establish a two-way communication with one or more network resources via network 109 seen in FIG. 1.

Client device 108 generates video signal(s) 220 and audio signal(s) 222, both of which are communicated to television 136. The video signals and audio signals can be communicated from client device 108 to television 136 via an RF (radio frequency) link, S-video link, composite video link, component video link, or other communication link. At reference numeral 203 in FIG. 2, client device 108 includes one or more lights or other request IDs identifying the current status of the device or for diagnostic reports to a viewer. Additionally, the client device may include one or more control buttons, switches, or other selectable controls for controlling operation of the device.

In FIG. 2, television 136 shows a display line 224 which can be used to inform a viewer that client device 108 has output a message as will be discussed below with respect to FIG. 7. The message so output can be issued to the viewer for their own edification and/or so that the viewer may take any action that may be warranted. Additionally, a diagnostic visual and/or audible alarm device or mechanism at reference numeral 203 can emit a diagnostic representative of that which is displayed at display line 224. In the alternative, both display line 224 and an alarm with the diagnostic visual and/or audible alarm device or mechanism at reference numeral 203 can be used so that the viewer may be warned visually and/or audibly.

Figure 3:
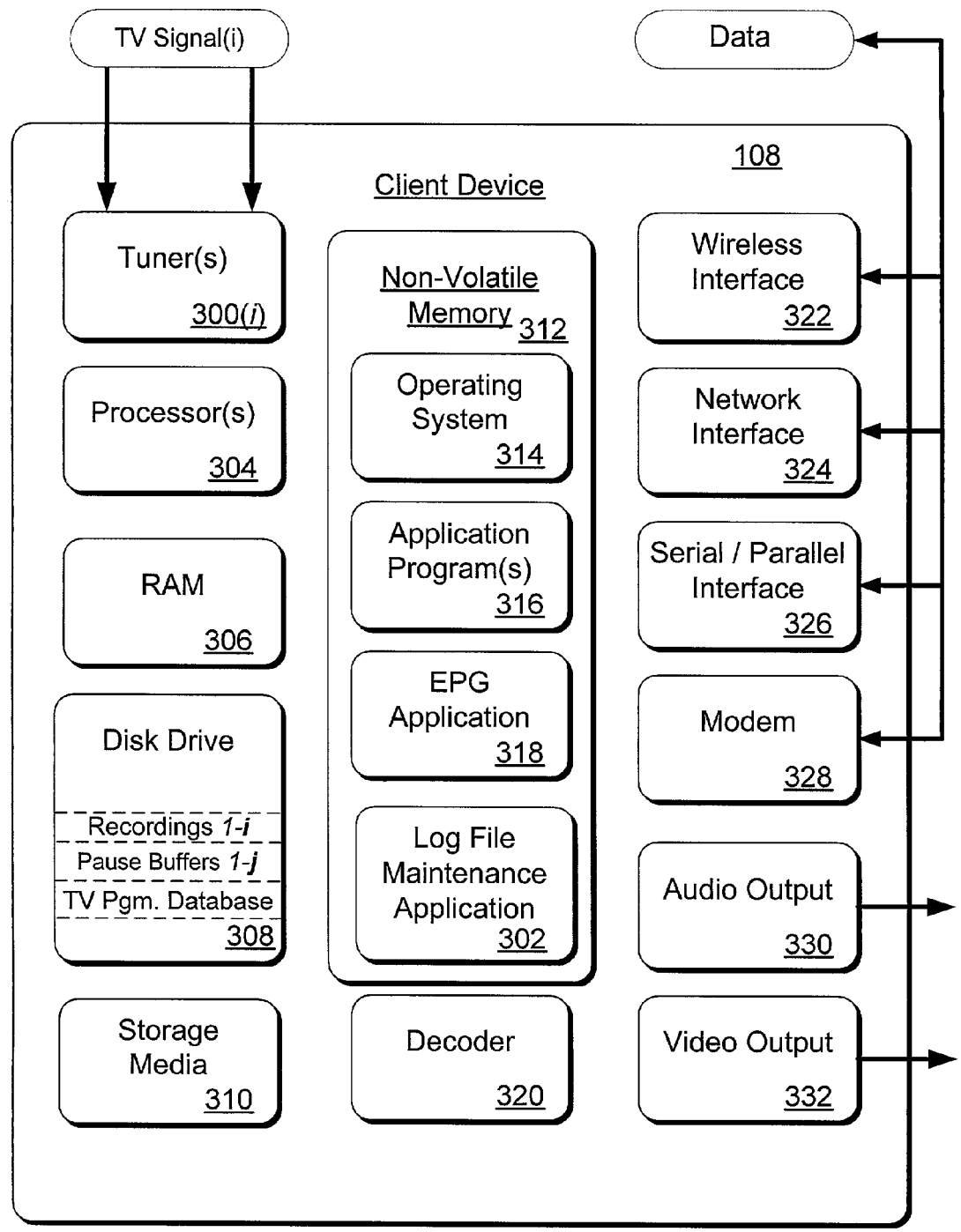
FIG. 3 is a block diagram that illustrates components of the example client device(s) shown in FIGS. 1–2.

FIG. 3 illustrates selected components of client device(s) 108 shown in FIGS. 1–2. Client device 108 includes one or more tuners 300(i). Tuners 300(i) are representative of one or more in-band tuners that tune to various frequencies or channels to receive television signals, as well as an out-of-band tuner that tunes to the broadcast channel over which the EPG data is broadcast to client device 108.

Client device 108 also includes one or more processors 304 and one or more memory components. Examples of possible memory components include a random access memory (RAM) 306, a disk drive 308, a mass storage component 310 such as a tape in a tape drive or removable media component in a removable media drive, and a non-volatile memory 312 (e.g., ROM, Flash, EPROM, EEPROM, etc.). Disk drive 308 can have one or a plurality of recordings (i) and one or a plurality of pause buffers (j) stored thereon. A TV program database can be stored on disk drive 308 to keep a respective show identifier (ID) for each TV program that can be broadcast. The TV program database can also keep a request ID for one or more of the show IDs that a viewer wishes to record with client device 108. Also stored in the TV program database is a log file of all TV programs that a household, client device 108, and/or a particular viewer wants to watch and/or record, or has previously watched and/or recorded. Recordings (i), pause buffers (j), and the TV program database can also be stored in one or more other memory devices at client device 108, such as in non-volatile memory 312, RAM 306, and/or storage media 310. Alternatively, recordings (i), pause buffers (j), and the TV program database can also be stored remote from client device 108 at a network resource in communication with client device 108 through interconnected network 109 seen in FIG. 1.

Alternative implementations of client device 108 can include a range of processing and memory capabilities, and may include more or fewer types of memory components than those illustrated in FIG. 3. For example, full-resource clients can be implemented with substantial memory and processing resources, including a disk drive 308 to store content for replay by the viewer. Low-resource clients, however, may have limited processing and memory capabilities, such as a limited amount of RAM 306, no disk drive 308, and limited processing capabilities. Nevertheless it is intended that client device 108 include a capability for video recording, either locally or remotely from client device 108.

Processor(s) 304 process various instructions to control the operation of client device 108 and to communicate with other electronic and computing devices. The memory components (e.g., RAM 306, disk drive 308, storage media 310, and non-volatile memory 312) store various information and/or data such as content, EPG data, configuration information for client device 108, and/or graphical user interface information.

An operating system 314 and one or more application programs 316 may be stored in non-volatile memory 312 and executed on processor 304 to provide a runtime environment. A runtime environment facilitates extensibility of client device 108 by allowing various interfaces to be defined that, in turn, allow application programs 316 to interact with client device 108. In the illustrated example, an EPG application 318 is stored in memory 312 to operate on the EPG data and generate a program guide.

FIG. 3 shows non-volatile memory 312 having a log file maintenance application 302, which, when executed by processor(s) 304, causes client device 108 to store information in the TV program database as to those TV programs that a household, client device 108, and/or a particular viewer has previously watched and/or recorded. A report can also be output from client device 108 that characterizes that data in the TV program database. The report output from client device 108, as well as other communications, can be communicated in a one or two-way communication through interconnected network 109 as shown in FIG. 1. These communications can be made with various network resources using network interface 324, wireless interface 322, serial/parallel interface 326, modem 328, or other well known communication hardware/software algorithms and protocol for computing devices.

The application programs 316 that may be implemented at client device 108, which can function with the log file maintenance application 302, include a browser to browse the Web so as to view diagnostics at a Web site, an electronic mail (email) program to facilitate email to transmit message emails to an email address, a facsimile transmission program to initiate a facsimile transmission to a facsimile machine through phone line 212 seen in FIG. 2 so as to send a facsimile message with respect to client device 108, a Short Message Service (SMS) transmission program to initiate a transmission of a text message with respect to client device 108 to a mobile pager on a page channel, and so on.

Client device 108 can also include other components pertaining to a television entertainment system which are not illustrated in this example for simplicity purposes. For instance, client device 108 can include a user interface application and user interface lights, buttons, controls, etc. to facilitate viewer interaction with the device.

Client device 108 also includes a decoder 320 to decode a broadcast video signal, such as an NTSC, PAL, SECAM or other TV system video signal. Alternatively, a decoder for client device 108 can be implemented, in whole or in part, as a software application executed by processor(s) 304. Wireless interface 322 allows client device 108 to receive input commands and other information from a viewer-operated input device, such as from a remote control device or from another IR, Bluetooth, or similar RF input device.

Network interface 324 and serial and/or parallel interface 326 allows client device 108 to interact and communicate with other electronic and computing devices via various communication links. Although not shown, client device 108 may also include other types of data communication interfaces to communicate with other devices. Modem 328 facilitates client device 108 communications with other electronic and computing devices via a conventional telephone line. Components seen at reference numerals 316 and 322–328 facilitate applications where client device 108 has Internet access or communicates data on a two-way network.

Client device 108 also includes an audio output 330 and a video output 332 that provide signals to a television or other device that processes and/or presents or otherwise renders the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference has been made herein to one or more client devices, such as client device 108. As used herein, "client device" means any electronic device having data communications, data storage capabilities, and/or functions to process signals, such as broadcast signals, received from any of a number of different sources.

Figure 4:
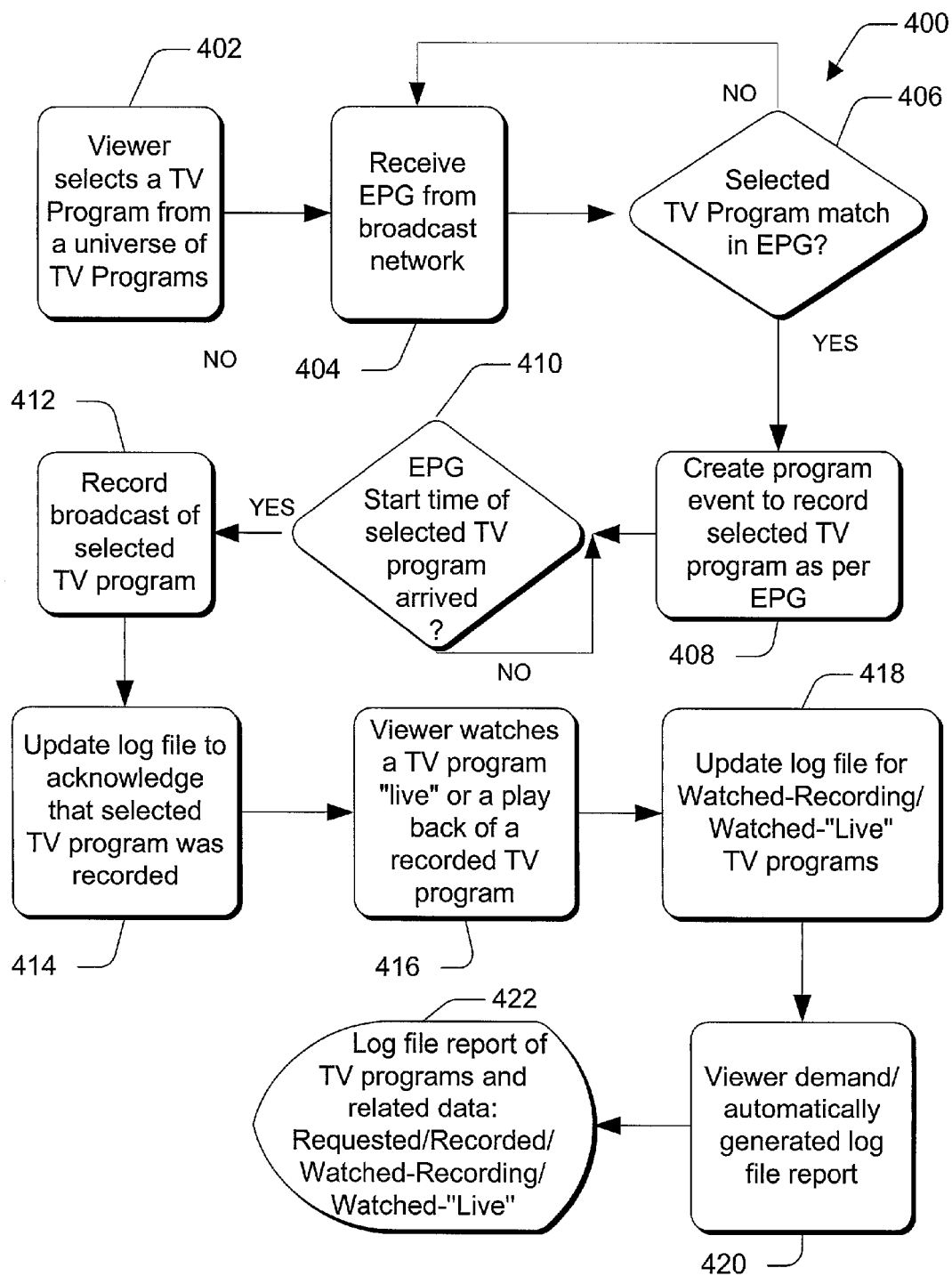
FIG. 4 is a flow diagram that illustrates a procedure for selecting a TV program for recording prior to its announced broadcast in a program guide, and for scheduling the TV program to be recorded after its broadcast schedule is announced in the program guide.

A process 400 is seen in FIG. 4 which can be used, for example, with respect to environments 100, 200 depicted, respectively, in FIGS. 1–2. FIG. 4 shows a process 400 for programming a client device to create a program event so as to record a TV program that is to be broadcast at a broadcast time. Process 400 includes selecting a TV program to be recorded from a universe of TV programs at block 402, receiving EPG data at block 404, and determining at block 406 if the EPG data includes the selected TV program. If not, the process 400 cycles at the EPG receiving act at block 404 and the determining act in block 406. When the EPG data is determined at block 406 to include the selected TV program, a program event is created at block 408. Process 400 moves to block 410 where a clock, such as a system clock of the client device, tests whether the EPG date and time of the TV program to be recorded has arrived. The time can be obtained from the broadcast received by the client device, by input from the viewer that is made to the client device, or by other known means. If the date or starting time of the TV program has not yet arrived, the process 400 cycles at block 410 until the date and starting time have arrived. When the actual time is matched against the start time of the selected TV program according to the EPG data at block 410, the selected TV program is recorded at block 412 as it is being broadcast. A log file is updated at block 414 when the selected TV program is recorded and also at block 416 when the recording is played back. Thus, the log file contains a history of the TV programs that a viewer wants to watch, has recorded, and has watched. In order to maintain a complete history of all programs that a viewer has ever watched, the log file is updated each time that a viewer watches a program. Thus, the log file is updated when a viewer watches a program "live" as it is being broadcast and well as when the viewer watches a program after it has been recorded by the client device.

Historical and other information can be kept in the log file by the household in which multiple viewers watch TV programs, by the client device in a household of multiple client devices, and/or by the viewer in household of multiple viewers. The log file can include information about each specific show that is to be recorded, has been recorded, or has been watched. A viewer can request a log file history report to view the contents thereof, or a report on the log file history can be automatically generated and output by the client device, as seen at blocks 420 and 422 of FIG. 4 in process 400. The report contents can be data that has been compiled and formatted by a client device for output in a suitable format.

The order in which the method is described with respect to process 400 is not intended to be construed as a limitation, and any number of the described method blocks can be combined in any order to implement the method. Furthermore, the method can be implemented in any suitable hardware, software, firmware, or combination thereof.

The client device can be a standalone device that outputs to a TV receiver. Alternatively, the client device can be in communication with other peripheral devices and/or with one or more network resources through an interconnected network. As such, the client device can output in various techniques, methods, or algorithms including, but not limited to, an audio output, a visual output, and by way of a transmission to an address on the interconnected network. In the case of the transmission, the transmission can include an addressed message. The transmission of the message can be to several different addresses including, but not limited to, transmitting the message for output at a printer having the address, transmitting the message for output on a television receiver having the address, transmitting the message for a facsimile transmission on a circuit switched network to a facsimile machine associated with a facsimile telephone number corresponding to the address, transmitting the message for a circuit switched network in a telephone transmission to a telephone number corresponding to the address, transmitting the message for a packet switched network to a network resource having the address as a publication to a Web site hosted by the network resource, transmitting the message in packets for a packet switched network to a network resource having the address, transmitting the message as email to an email address at an email server serving the address, and transmitting the message for an SMS transmission to a mobile pager on a page channel.

The message output by the client device can be written as an entry to the log file. The client device can then optionally output all or a portion of the log file. As such, a complete history of the log file, including any addressed messaging, can be established and reported for each TV program selected, recorded and/or watched by a viewer through the client device.

Figure 5:
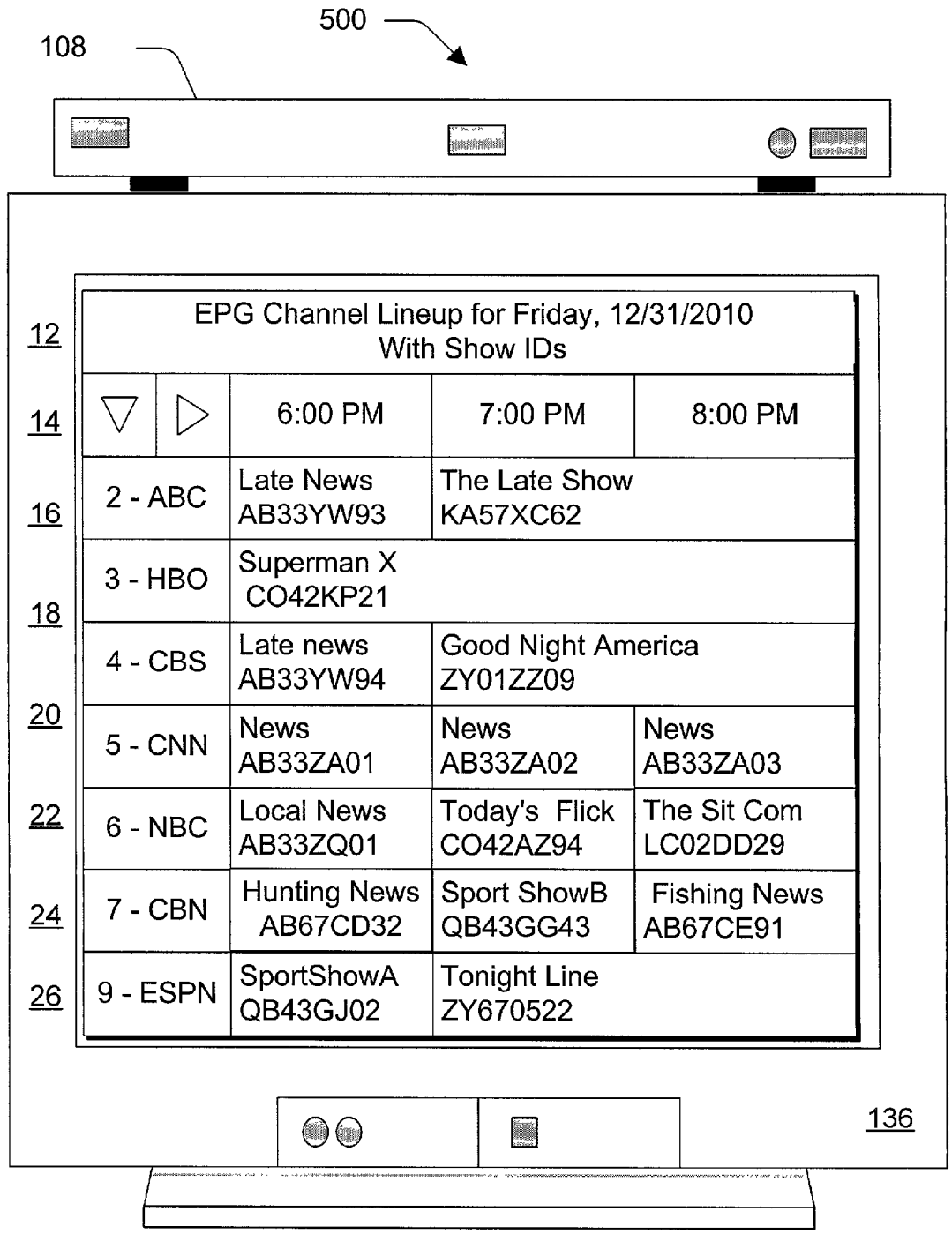
FIG. 5 illustrates, in a front elevation view, an exemplary environment in which a client device outputs a section of an electronic program guide (EPG) resulting in a display of same upon a television, where the EPG lists each of a plurality TV programs scheduled for broadcast and their respective unique codes.

With reference to FIG. 5, an exemplary system 500 for implementing entertainment architecture includes client device 108 in communication with television 136. Television 136 has display lines 12 through 26 where there is displayed an example of a program guide showing part of a channel programming lineup for Friday, Dec. 31, 2010. The program guide is generated with an EPG application in client device 108 with program data, where part of the program data is displayed on television 136. The program guide provides a viewer with a program title, the associated local channel number and/or television broadcasting company that will broadcast the program, a time of the day that the program will be broadcast, and the respective show ID. Each TV program in the EPG can be matched to its corresponding show ID by the publisher of the EPG, one or more program data providers, and/or by an entertainment industry service provider or other entity such as a Web hosting service.

The program guide assists a viewer to identify and select a program title that the viewer wishes to view or record if the program is currently being broadcast, access program data to learn more about the program, and/or enter a request to record the program if the program is to air in the future. A viewer can move within the program guide, using an input device such as a remote control device, to input control commands to client device 108.

In display line 12, an explanation for the display on television 136 is given that the display shows a portion of the EPG channel lineup for the date Friday, Dec. 31, 2010. Display line 14, in the first column thereof, shows scrollable user interface icons. The first icon in the first column of display line 14 indicates that a viewer can scroll vertically to show various channels for the 6:00 P.M. to 9:00 P.M. time period. The second icon in the second column of display line 14 indicates that the viewer can scan chronologically forward and backwards for each of the displayed channels 2 through 9. The second, third and fourth columns indicate the timeslots 6 P.M., 7 P.M., and 8 P.M.

Display line 16 shows the lineup for channel 2, the "ABC" television broadcast network. As seen in the second column of display line 16 two programs are indicated, namely the Late News at 6 P.M. and the Late Show at 7 P.M. Display line 17 shows the lineup for channel 3, the "HBO" television broadcast network to be a TV program titled "Superman X" that starts at 6:00 PM and continues to 9:00 PM. Display line 24 for the display on television 136 shows the channel 7 line up for the CBN network. The line up includes several chronologically adjacent TV programs to be broadcast on Channel 7, including the Hunting News to begin at 6:00 P.M. and to continue until 7:00 P.M., the Sport Show B to begin at 7:00 P.M. and to continue until 8:00 P.M., and the Fishing News to begin at 8:00 P.M. Display line 26 shows that Sport Show A begins at 6 P.M. and continues until 7 P.M. on channel 9 on the ESPN television broadcast network. A viewer can use an input device, such as those seen at reference numerals 204–208 in FIG. 2, to select one or more of the TV programs of the EPG seen in FIG. 5 to be recorded.

Figure 6:
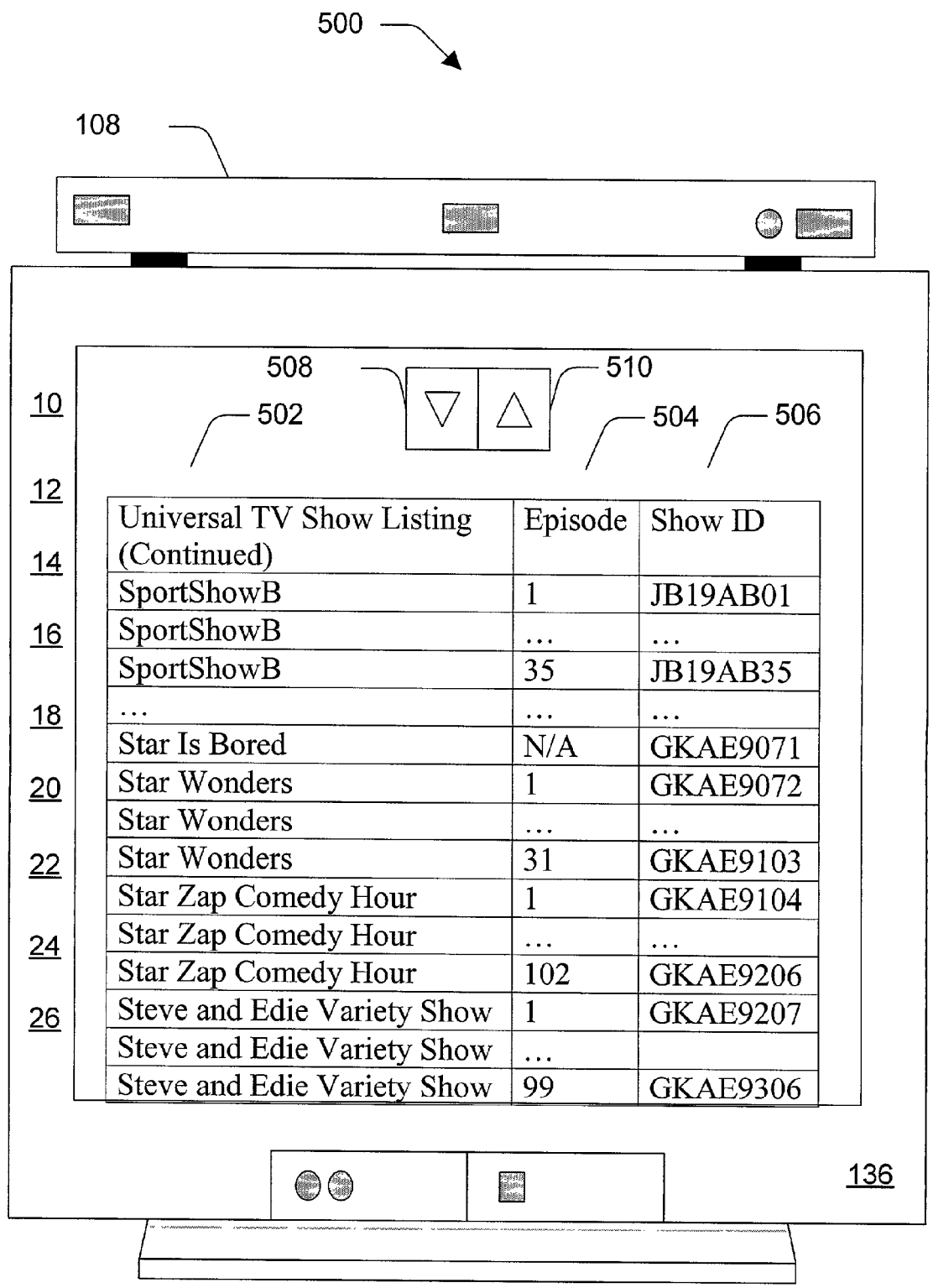
FIG. 6 shows the client device outputting, for display upon the television of FIG. 5, a subset of a universe list of TV programs that can be broadcast and their respective unique codes.

With reference to FIG. 6, the exemplary system 500 shows television 136 having a display of a table in display lines 10 through 26 where there is shown a portion of a universal list of TV programs that can be broadcast. Column 502 gives the title of each of the TV programs in display lines 14 through 27. Column 504 gives the episode. The episode can be, by way of example and not by way of limitation, a sequence number associated with a series of related broadcasts, such as installments of a documentary, games in a sports series, or a derivative of an original work. Display line 18 lists the TV program "Star Is Bored" as having no sequel. Column 506 gives the corresponding show ID to each of the TV programs in display lines 14 through 27. Each show ID is unique to each TV program among TV programs that can be announced in an EPG. Each show ID can be created and assigned to a respective TV program by an entertainment industry service provider, or other entity. The show IDs can then be made available on the Internet, such as via a Web hosting service. A client device, such as a set top box or digital video recorder, can communicate with the Web hosting service to obtain the show IDs.

Display line 10 in FIG. 6 shows scrollable user interface icons. The first and second icons at reference numerals 508 and 510 in the first column of display line 10 indicate that a viewer can, respectively, scroll vertically down and up to display TV programs that can be selected for recording. Icons 508 and 510 can be activated using an input device that outputs to client device 108 so as to initiate an operation that effects a change in the output from client device 108 for display on television 136.

Figure 7:
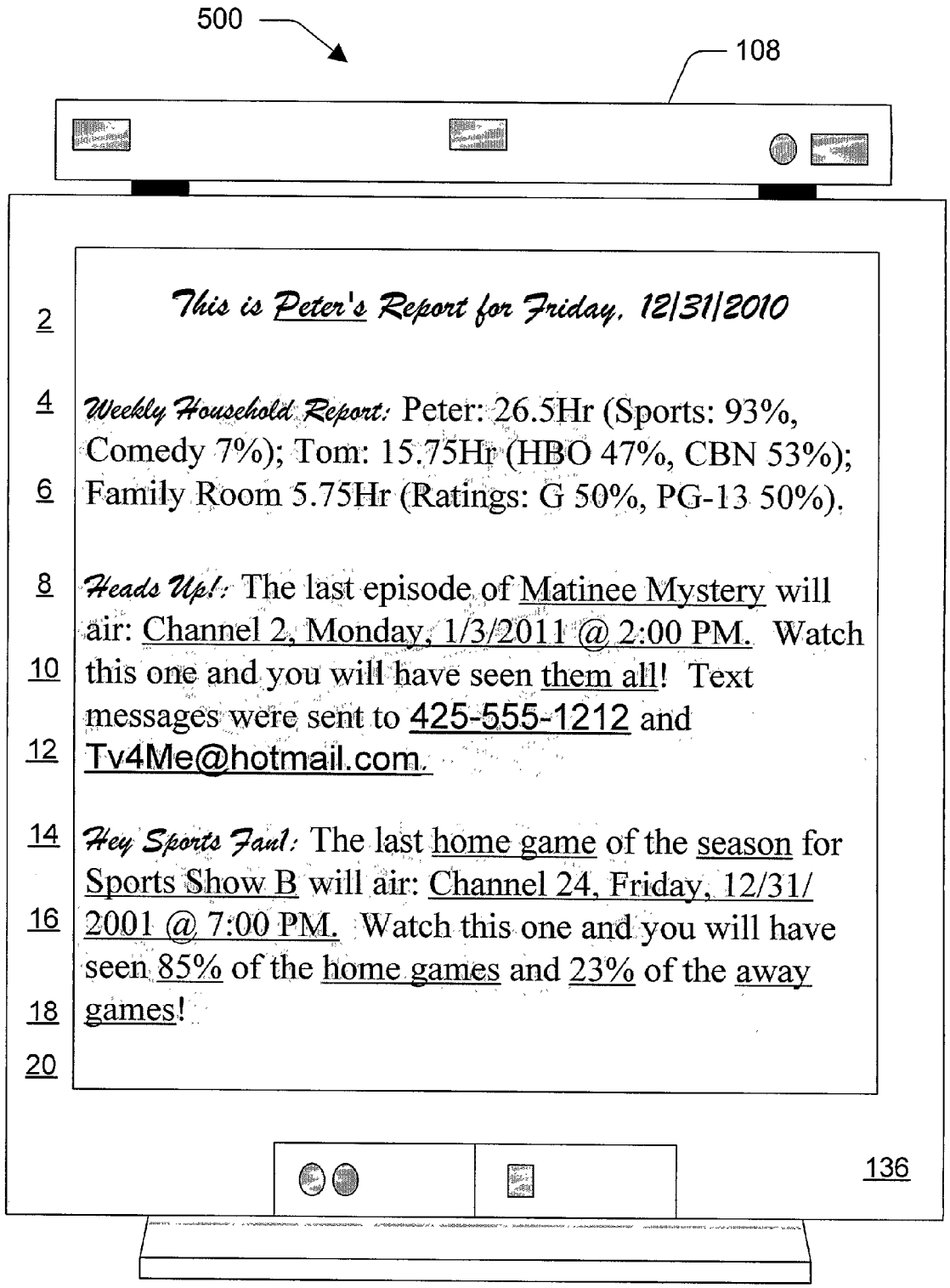
FIG. 7 shows the client device outputting diagnostics upon the television of FIGS. 5–6.

With respect to FIG. 7, a report for the viewer "Peter" is output, as designated at display line 2. There are displayed three (3) diagnostics on television 136. The first diagnostic is seen in FIG. 7 at display lines 4 through 6 is indicative that a viewer demand report and/or an automatically generated report has been output by client device 108. The report contains data compiled from a log file with respect to the viewing totals of the viewers Peter and Tom. Peter is reported to have watched 26.5 hours of television of which 93% was within the genre of sports and the remainder within that of comedy. The statistics compiled on Tom from the log file reveal that a majority of his viewing has been on the HBO channel with the remainder being on the CBN channel. A client device, designated as "Living Room" in display line 6 is reported to have output 5.75 hours of programming, half of which was rated G, and half of which was rated PG-13.

Display lines 8–12 show that the client device has computed data in the log file so as to report that Peter has watched each prior episode of Matinee Mystery and that Peter will have seen all of the installments if he also watches the final episode on channel 2 the following Monday. In this implementation, the report is compiled so as to coordinate an EPG with a log file containing a viewer's viewing history against a database containing a universe of TV programs that can be broadcast. As such, the client device determined from the database of the universe list of TV programs that particular episodes of Matinee Mystery can and/or are available to be broadcast. The log file of the viewers viewing history is compared to the particular episodes to determine those episodes that Peter has not yet recorded and/or watched. The client device can then examine EPG data to which it has access to determine if and when the unwatched particular episodes will be broadcast. When so determined, the client device addresses messages, via telephone and email, to keep the viewer informed. Similar to the report in display lines 8–12, display lines 14–18 show a report derived from similar data by client device 108 that reports the viewer Peter to have seen respective percentages of home and away games after Peter watches a forthcoming broadcast of Sports Show B.

Implementations extend to methods, apparatus, client devices, computer programs, and systems for selecting TV programs for recording prior to their announced broadcast in an EPG. The implementations may comprise a special purpose or general purpose computer including various computer hardware as discussed by way of example in greater detail above. Implementations also include computer-readable media for carrying or having computer-executable instructions or data structures stored thereon. Such computer-readable media can be any available media which can be accessed by a general purpose or special purpose computer. One example of a special purpose computer is a set top box. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The Figures and the foregoing discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented, at least in part, by a computing device, the method comprising:
   maintaining a plurality of show identifiers (IDs) that each represent a television (TV) program that may, at some future time, be scheduled for broadcast;
   associating a primary request ID with a particular one of the show IDs to indicate a user's interest in the TV program represented by the particular show ID, wherein the TV program represented by the show ID is not currently scheduled for a current or future broadcast;
   receiving at a later time, programming guide data that identifies TV programs scheduled for broadcast during an upcoming time period, where the TV programs that are scheduled for broadcast comprise a subset of the TV programs represented by the show IDs;
   identifying the TV program associated with the primary request ID in the programming guide data, wherein the programming guide data indicates that the TV program associated with the primary request ID is scheduled to be broadcast from a broadcast start time through a broadcast end time on a broadcast channel;
   automatically generating a program event, thereby scheduling the TV program associated with the primary request ID to be recorded according to the programming guide data;
   automatically recording the TV program associated with the primary request ID at the broadcast start time based on the program event; and,
   responsive to playback of the TV program, updating a log file, which includes a history of TV programs watched, to indicate that the TV program has been watched.

2. The method as defined in claim 1, wherein the associating comprises:
   receiving a request to identify the TV program represented by the particular show ID from an entity selected from a group comprising a household, a client device in the household, and a viewer in the household.

3. The method as defined in claim 1, further comprising associating a secondary request ID with the particular show ID to indicate that the TV program has been recorded.

4. The method as defined in claim 1, further comprising associating each of the TV programs identified in the programming guide data with a corresponding show ID, wherein the plurality of show IDs collectively represent the universe of all TV programs that can be identified in the programming guide data.

5. The method as defined in claim 3, further comprising:
   playing back a recording of the TV program; and
   associating a third request ID with the particular show ID to indicate that a recording of the TV program has been played back.

6. The method as defined in claim 1, further comprising associating a secondary request ID with a second show ID to indicate a request to not record the TV program represented by the second show ID.

7. The method as defined in claim 5, wherein:
   the secondary request ID comprises an identity of a requestor responsible for associating the primary request ID with the particular show ID representing the TV program; and
   the third request ID comprises an identity of a requestor of the play back of the recorded TV program.

8. The method as defined in claim 7, wherein the requestors are selected from a group comprising of a household, a TV receiver in the household, and a viewer in the household.

9. One or more computer-readable media comprising computer-executable instructions that, when executed, direct a computing system to perform the method of claim 1.

10. One or more computer-readable media comprising computer-executable instructions that, when executed, direct a computing system to perform a method comprising:
    associating a request ID with a show ID among a plurality of show IDs each being unique to a corresponding television (TV) program in a universe of TV programs that can be broadcast, wherein the show ID corresponds to a TV program that is not currently scheduled for a current or future broadcast;
    receiving, after associating the request ID with the show ID, a subset of the universe of TV programs that can be broadcast with a respective channel, start time and duration for each said TV program of the subset;
    scheduling for recording one said TV program of the subset to which the request ID corresponds according to the respective channel, start time and duration thereof;
    recording the one said TV program of the subset when broadcast on the respective channel from the start time and for the duration thereof;
    performing a play back of the recorded TV program;
    updating a log file for the play back of the recorded TV program as being watched, wherein the log file includes a history of TV programs watched; and
    outputting a report derived from the log file and containing the history of TV programs watched.

11. An apparatus comprising a processor in communication with a video recorder, a receiver, and a memory containing a programming guide, the processor executing an application to:
    identify a television (TV) program in the programming guide that is to be broadcast from a broadcast start time through a broadcast end time on a broadcast channel, the TV program corresponding to a primary request ID in a database in the memory;
    create a program event to record the TV program from the broadcast start time through the broadcast end lime on the broadcast channel, wherein the database includes:
       a plurality of show IDs each representing a TV program that can be identified in the programming guide, wherein at least one of the plurality of show IDs represents a TV program that is not identified in the programming guide;
       a plurality of said primary request IDs each representing a request to identify the TV program corresponding to one said show ID;
    responsive to playback of the TV program, update a log file, which includes a history of TV programs watched, to indicate that the TV program has been watched.

12. The apparatus as defined in claim 11, wherein:
    the database further comprises a plurality of secondary request IDs each representing a TV program that has been recorded in the memory; and
    the method further comprises:
       recording the TV program corresponding to the program event from the broadcast start time through the broadcast end time on the broadcast channel; and
       adding one said secondary request ID to the database for the TV program corresponding to the program event.

13. The apparatus as defined in claim 11, wherein the plurality of show IDs collectively represent the universe of all TV programs that can be identified in the programming guide.

14. The apparatus as defined in claim 11, wherein:
the database in the memory further comprises a plurality of third request IDs each representing a TV program that has been recorded and played back; and
the processor executes the application to further:
play back a recording of the TV program corresponding to the program event; and
adds one said third request ID to the database for the TV program corresponding to the program event.

15. The apparatus as defined in claim 11, wherein the database in the memory further comprises a plurality of third request IDs each representing a TV program corresponding to one said show ID that has been requested not to be recorded in the memory.

16. The apparatus as defined in claim 14, wherein:
each said secondary request ID has a component representing an identity of a requestor of the recording of the TV program corresponding to the program event; and
each said third request ID has a component representing an identity of a requestor of the play back of a recording of the TV program corresponding to the program event.

17. The apparatus as defined in claim 16, wherein the requestors are selected from a group comprising a household, a TV receiver in the household, and a viewer in the household.

18. A client device comprising:
means for identifying in a programming guide a television (TV) program that is to be broadcast from a broadcast start time through a broadcast end time on a broadcast channel and that corresponds to a primary request ID in a database;
means for creating a program event to record the TV program from the broadcast start time through the broadcast end time on the broadcast channel, wherein the database includes:
a plurality of show IDs each representing a TV program that can be identified in the programming guide, wherein at least one of the plurality of show IDs represents a TV program that is not identified in the programming guide;
a plurality of said primary request IDs each representing a request to identify the TV program corresponding to one said show ID;
means for recording the TV program from the broadcast start time through the broadcast end time on the broadcast channel based on the program event; and,
means for updating a log file responsive to playback of the TV program to indicate that the TV program has been watched, wherein the log file includes a history of TV programs watched.

19. The client device as defined in claim 18, wherein:
the database further comprises a plurality of secondary request IDs each representing a TV program that had been recorded; and
the client device further comprises:
means for adding one said secondary request ID to the database for the TV program corresponding to the program event.

20. The client device as defined in claim 18, wherein the plurality of show IDs collectively represent the universe of all TV programs that can be identified in the programming guide.

21. The client device as defined in claim 19, wherein:
the database further comprises a plurality of third request IDs each representing a TV program that has been recorded and played back; and
the client device further comprises:
means for playing back a recording of the TV program corresponding to the program event; and
means for adding one said third request ID to the database for the TV program corresponding to the program event.

22. The client device as defined in claim 18, wherein the database further comprises a plurality of fourth request IDs each representing a TV program that is not to be recorded.

23. The client device as defined in claim 21, wherein:
each said secondary request ID has a component including an identity of a requestor of the recording of the TV program corresponding to the program event; and
each said third request ID has a component thereof including an identity of a requestor of the play back of the recording of the TV program corresponding to the program event.

24. The client device as defined in claim 23, wherein the requestors are selected from a group comprising of a household, a TV receiver in the household, and a viewer in the household.

25. The client device as defined in claim 18, embodied as a digital video recorder.

26. A television (TV) broadcasting system comprising:
a TV broadcast network for broadcasting video signals on a plurality of channels;
a network resource including:
a content database storing content of a plurality of video broadcast events;
a content serving module to serve the video broadcast events by broadcasting on the TV broadcast network;
a guide database storing event schedules each including one said channel, a start time, and a duration corresponding to one said video broadcast event on the broadcast network; and
a guide sewing module to serve the event schedules by broadcasting on the TV broadcast network;
a client device including:
a receiver to receive a video signal and to receive the event schedules broadcast on the TV broadcast network;
a memory to store the event schedules and to store video data received in a video signal by the receiver;
a video recorder to create a recording of video data in the memory and to play back the recording of video data in the memory;
a processor executing an application to:
identify one said video broadcast event by a corresponding one said event schedule in the memory that corresponds to a primary request ID in a database in the memory; and
create a program event to record the one said video broadcast event corresponding to the primary request ID, wherein the database includes:
a plurality of show IDs each representing a video broadcast event that can be identified in the event schedules, wherein at least one of the plurality of show IDs represents a video broadcast event that is not currently identified in the event schedules; and
a plurality of said primary request IDs each representing a request to identify the video broadcast event corresponding to one said show ID record the one said video broadcast event when broadcast on the TV broadcast network from the start time and for the duration thereof;

perform a play back of the recorded video broadcast event;

update a log file responsive to playback of the video broadcast event to indicate that the video broadcast event has been watched, wherein the log file includes a history of video broadcast events watched.

27. The TV broadcasting system as defined in claim 26, wherein:

the database further comprises a plurality of secondary request IDs each representing one said video broadcast event that has been recorded in the memory; and the processor executes the application further to:
record the one said video broadcast event corresponding to the primary request ID; and
add one said secondary request ID to the database for the one said video broadcast event corresponding to the primary request ID.

28. The TV broadcasting system as defined in claim 26, wherein the plurality of show IDs collectively represent the universe of all video broadcast events that can be identified in the event schedule in the memory.

29. The TV broadcasting system as defined in claim 26, wherein:

the database in the memory further comprises a plurality of third request IDs each representing a TV program that has been recorded and played back; and the processor executes the application to further:
play back a recording of the one said video broadcast event corresponding to the primary request ID; and
add one said third request ID to the database for the one said video broadcast event corresponding to the primary request ID.

30. The TV broadcasting system as defined in claim 26, wherein the database in the memory further comprises a plurality of fourth request IDs each representing a TV program that has been requested not to be recorded.

31. The TV broadcasting system as defined in claim 29, wherein:

each said secondary request ID has a component including an identity of a requestor of the recording of the one said video broadcast event corresponding to the primary request ID; and each said third request ID has a component thereof including an identity of a requestor of the play back of the recording of the one said video broadcast event corresponding to the primary request ID.

32. The TV broadcasting system as defined in claim 31, wherein the requestors are selected from a group comprising a household, a TV receiver in the household, and a viewer in the household.

33. A system comprising:

means for content distribution including:
means for broadcasting video signals on a plurality of channels;
means for storing content of a plurality of video broadcast events;
means for sewing the video broadcast events by broadcasting on the means for broadcasting video signals;
means for storing event schedules each including one said channel, a start time, and a duration corresponding to one said video broadcast event; and
means for sewing the event schedules by broadcasting on the means for broadcasting video signals;

means for receiving content distribution including:
means for receiving the event schedules and a video signal;
means for storing in a memory an application and, as received by the means for receiving, the event schedules and video data received in the video signal;
means for recording the video data in the memory;
means for playing back the video data recorded in the memory;
means for executing the application to:
identify one said video broadcast event by a corresponding one said event schedule in the memory that corresponds to a primary request ID in a database in the memory; and
create a program event to record the one said video broadcast event corresponding to the primary request ID, wherein the database includes:
a plurality of show IDs each representing a video broadcast event that can be identified in the event schedules, wherein at least one of the plurality of show IDs represents a video broadcast event that is not currently identified in the event schedules; and
a plurality of said primary request IDs each representing a request to identify the video broadcast event corresponding to one said show ID;
means for recording the one said video broadcast event corresponding to the primary request ID based on the program event
means for performing a play back of the recorded video broadcast event;
means for updating a log file for the play back of the recorded video broadcast event as being watched, wherein the log file includes a history of video broadcast events watched; and
means for outputting a report derived from the log file and containing the history of video broadcast events watched.

34. The system as defined in claim 33, wherein:

the database further comprises a plurality of secondary request IDs each representing one said video broadcast event that has been recorded in the memory by the means for recording the video data in the memory; and the means for executing the application executes the application further to:
add one said secondary request ID to the database for the one said video broadcast event corresponding to the primary request ID.

35. The system as defined in claim 33, wherein the plurality of show IDs collectively represent the universe of all video broadcast events that can be identified in the event schedule in the memory.

36. The system as defined in claim 34, wherein:

the database further comprises a plurality of third request IDs each representing a television (TV) program that had been recorded; and the means for receiving content distribution further comprises:
means for playing back a recording of the one said video broadcast event that corresponds to the primary request ID; and
means for adding one said third request ID to the database for the one said video broadcast event that corresponds to the primary request ID.

37. The system as defined in claim 33, wherein the database further comprises a plurality of fourth request IDs each representing a TV program that has been requested not to be recorded.

38. The system as defined in claim 36, wherein:
   each said secondary request ID has a component including an identity of a requestor of a recording of the one said video broadcast event corresponding to the primary request ID; and
   each said third request ID has a component thereof including an identity of a requestor of the play back of the recording of the one said video broadcast event corresponding to the primary request ID.

39. The system as defined in claim 38, wherein the requestors are selected from a group comprising a household, a TV receiver in the household, and a viewer in the household.

40. One or more computer-readable media comprising computer executable instructions that, when executed, direct a client device to:
   identify in a programming guide a television (TV) program that is to be broadcast from a broadcast start time through a broadcast end time on a broadcast channel and that corresponds to a primary request ID in a database; and
   create a program event to record the TV program from the broadcast start time though the broadcast end time on the broadcast channel, wherein the database includes:
      a plurality of show IDs each representing a TV program that can be identified in the programming guide, wherein at least one of the plurality of show IDs represents a TV program that is not currently identified in the programming guide;
      a plurality of said primary request IDs each representing a request to identify the TV program corresponding to one said show ID;
   record the TV program when broadcast on the respective channel from the broadcast start time through the broadcast end time;
   perform a play back of the recorded TV program;
   update a log file for the play back of the recorded TV program as being watched, wherein the log file includes a history of TV programs watched; and
   outputting a report derived from the log file and containing the history of TV programs watched.

41. One or more computer-readable media as defined in claim 40, wherein:
   the database further comprises a plurality of secondary request IDs each representing a TV program that had been recorded; and
   the one or more computer-readable media further comprises computer executable instructions that, when executed, direct the client device to:
      record the TV program corresponding to the program event from the broadcast start time through the broadcast end time on the broadcast channel; and
      add one said secondary request ID to the database for the TV program corresponding to the program event.

42. One or more computer-readable media as defined in claim 40, wherein the plurality of show IDs collectively represent the universe of all TV programs that can be identified in the programming guide.

43. One or more computer-readable media as defined in claim 41, wherein:
   the database further comprises a plurality of third request IDs each representing a TV program that has been recorded and played back; and
   the one or more computer-readable media further comprises computer executable instructions that, when executed, direct the client device to:
      play back a recording of the TV program corresponding to the program event; and
      add one said third request ID to the database for the TV program corresponding to the program event.

44. One or more computer-readable media as defined in claim 40, wherein the database further comprises a plurality of fourth request IDs each representing a TV program that has been requested not to be recorded.

45. One or more computer-readable media as defined in claim 43, wherein:
   each said secondary request ID has a component including an identity of a requestor of a recording of the TV program corresponding to the program event; and
   each said third request ID has a component thereof including an identity of a requestor of the play back of the recording of the TV program corresponding to the program event.

46. One or more computer-readable media as defined in claim 45, wherein the requestors are selected from a group comprising a household, a TV receiver in the household, and a viewer in the household.

47. One or more computer-readable media as defined in claim 46, further comprising computer executable instructions that, when executed, direct the client device to output a report descriptive of at least one of:
   the recording of TV programs requested by at least one of the household, the TV receiver in the household, or the viewer in the household; and
   the play back of TV programs by at least one of the household, the TV receiver in the household, or the viewer in the household.

48. One or more computer-readable media as defined in claim 47, wherein the report is output so as to be addressed to a network resource in communication with an interconnected network.

49. One or more computer-readable media as defined in claim 47, wherein the report includes for each said TV program information selected from a group compnsing a broadcast channel of the TV program, a broadcast duration of the TV program, a description of the TV program, a rating of the TV program, an actor appearing in the TV program, a director of the TV program, a writer of the TV program, a producer of the TV program, and a genre of the TV program.

50. A database comprising:
   a plurality of show identities (IDs) each representing an audio-visual content item, wherein the plurality of show IDs respectively represent a universe of all audio-visual content items that can be broadcast, including at least one audio-visual content item that is not scheduled for a current or future broadcast; and
   a plurality of primary request IDs each representing an operation by a requestor upon the audio-visual content item corresponding to one said show ID, wherein each primary request ID indicates a particular audio-visual content item that has been, or that is desired to be, watched or recorded, and wherein the requestor is selected from a group comprising a household, a client device in the household, and a viewer in the household, and
   a log file which contains a history of audio-visual content items watched, and which can be updated to indicate that the particular audio-visual content item has been watched.

51. The database as defined in claim 50, wherein:
the operation upon the audio-visual content item is an acknowledgement selected from a group comprising:
an acknowledgement that a recording of the audio-visual content item has been made;
an acknowledgment that a play back of the recording of the audio-visual content item has been performed;
a request to record the audio-visual content item; and
a request to play back the recording of the audio-visual content item.

52. The database as defined in claim 50, further comprising a plurality of secondary request IDs each representing a request that there be no future operation upon the audio-visual content item corresponding to one said show ID.

53. The database as defined in claim 52, wherein:
each said audio-visual content item comprises a television (TV) program; and
the request that there be no future operation upon the audio-visual content item corresponding to one said show ID is a request not to record the TV program corresponding to one said show ID.

54. The database as defined in claim 51, wherein each said primary request ID representing an operation upon the audio-visual content item corresponding to one said show ID has a component thereof selected from a group comprising:
an identity of the requestor of the recording of the audio-visual content item that has been made; and
an identity of the requestor of the play back of the recording of the audio-visual content item that has been performed.

55. The database as defined in claim 54, wherein the requestor is selected from a group comprising a household, a television (TV) receiver in the household, and a viewer in the household.

56. One or more computer-readable media comprising computer-executable instructions that, when executed, direct a computing system to maintain a database comprising:
a plurality of show IDs each representing a television (TV) program, wherein the plurality of show IDs collectively represent the universe of all TV programs, including at least one show ID that represents a TV program not scheduled for a current or future broadcast;
one or more first tags, each associated with a respective one said show ID, and representing an acknowledgement that there had been made either a recording of the corresponding TV program or a play back of the corresponding TV program; and
one or more second tags, each associated with a respective one said show ID, and representing a request to record the corresponding TV program; and,
a log file which contains a history of TV programs watched, and which can be updated to indicate that the TV program has been watched.

57. The one or more computer-readable media as defined in claim 56, wherein the request to record the corresponding TV program is an acknowledgement that there will be a play back of the corresponding TV program.

58. The one or more computer-readable media as defined in claim 56, further comprising one or more third tags, each associated with a respective one said show ID, and representing a request not to record the corresponding TV program, each said third tag optionally including a numerical expression of time after which one said second tag will be set to represent a request to record the corresponding TV program.

59. The one or more computer-readable media as defined in claim 56, wherein each said first tag has a component thereof selected from a group comprising:
an identity of a requestor of the recording of the corresponding TV program; and
an identity of a requestor of a play back of the corresponding TV program.

60. The one or more computer-readable media as defined in claim 59, wherein the requestor is selected from a group comprising a household, a TV receiver in the household, and a viewer in the household.

* * * * *

UNITED STATES PATENT AND TRADEMARK OFFICE
CERTIFICATE OF CORRECTION

| | | |
|---|---|---|
| PATENT NO. | : 7,200,611 B2 | Page 1 of 1 |
| APPLICATION NO. | : 10/145461 | |
| DATED | : April 3, 2007 | |
| INVENTOR(S) | : Peter J. Potrebic et al. | |

It is certified that error appears in the above-identified patent and that said Letters Patent is hereby corrected as shown below:

In column 5, line 7, delete "transmifted" and insert -- transmitted --, therefor.

In column 6, line 49, delete "and1or" and insert -- and/or --, therefor.

In column 16, line 43, in Claim 11, delete "lime" and insert -- time --, therefor.

In column 17, line 50, in Claim 18, delete "lime" and insert -- time --, therefor.

In column 18, line 40, in Claim 26, delete "sewing" and insert -- serving --, therefor.

In column 19, line 61, in Claim 33, delete "sewing" and insert -- serving --, therefor.

In column 19, line 66, in Claim 33, delete "sewing" and insert -- serving --, therefor.

In column 21, line 27, in Claim 40, delete "though" and insert -- through --, therefor.

In column 22, line 41, in Claim 49, delete "compnsing" and insert -- comprising --, therefor.

In column 22, line 54, in Claim 50, after "broadcast;" delete "and".

In column 22, line 62, in Claim 50, after "household" delete "," and insert -- ; --, therefor.

Signed and Sealed this

Twentieth Day of July, 2010

David J. Kappos
*Director of the United States Patent and Trademark Office*